US008555246B2

(12) United States Patent
Sreedhar

(10) Patent No.: US 8,555,246 B2
(45) Date of Patent: *Oct. 8, 2013

(54) METHOD AND APPARATUS FOR PROGRAMMING SOFTWARE COMPONENTS

(75) Inventor: Vugranam C. Sreedhar, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,097

(22) Filed: Feb. 28, 2012

(65) Prior Publication Data

US 2012/0185825 A1 Jul. 19, 2012

Related U.S. Application Data

(63) Continuation of application No. 09/925,580, filed on Aug. 9, 2001, now Pat. No. 8,171,454.

(51) Int. Cl.
*G06F 9/44* (2006.01)

(52) U.S. Cl.
USPC .......................................................... 717/116

(58) Field of Classification Search
USPC ................... 717/100–123, 162–167
See application file for complete search history.

(56) References Cited

U.S. PATENT DOCUMENTS 8,171,454 B2 * 5/2012 Sreedhar ........................ 717/116

OTHER PUBLICATIONS

Ancona et al., "Jam-A Smooth Extension of Java with Mixins," ECOOP, 154-178 (2000).

Ancona et al., "True Modules for Java-Like Languages," European Conference on Object-Oriented Programming Language, LNCS, Springer-Verlag, Berline (2000).

Beugnard et al., "Making Components Contract Aware," IEEE 38-44 (1999).

Clifton et al. "MultiJava: Modular Open Classes and Symmetric Multiple Dispatch for Java," 2000 ACM, (Oct. 2000).

Curbera et al., "On Component Composition Languages," Proc. of the 5th International Workshop on Component-Oriented Programming (2000).

Fisher et al., "The Design of a Class Mechanism for MOBY," Proc. of the ACM SIGPLAN (1999).

Flatt et al., "Units: Cool Modules for HOT Languages," Conference on Programming Language Design and Implementation (1998).

Flatt et al., "A Programmer's Reduction Semantics for Classes and Mixins," TR 97-293: Corrected Version (1999).

(Continued)

*Primary Examiner* — Ted T Vo

(74) *Attorney, Agent, or Firm* — Ryan, Mason & Lewis, LLP

(57) ABSTRACT

A method and apparatus are disclosed for programming software components that treats software components as the basic unit of abstraction and computation. A software component is encapsulated and classes and other program entities, such as data fields and methods, within a given component do not exist beyond a component boundary. A component interacts with other components only by means of a defined set of input and output ports. A component can inherit and implement ports declared in a template and can declare and implement new ports. A component can only access the external environment through its output ports. An output port of one component can only be connected to a conforming input port of another component. A connect statement is an explicit plumbing operation for connecting components together. Interactions between components are loosely coupled. A related set of templates can be grouped together to form a group.

5 Claims, 4 Drawing Sheets

(56) References Cited

OTHER PUBLICATIONS

Garlan et al. "Adding Implicit Invocation to Traditional Programming Languages," IEEE (1993).
Goguen., "Reusing and Interconnecting Software Components," IEEE Computers (1986).
Kniesel., "Type-Safe Delegation for Run-Time Component Adaption," ECOOP, 351-366 (1999).
Lorenz et al., "Designing Components Versus Objects: A Transformational Approach," International Conference on Software Engineering (2001).
McDirmid et al., "Jiazzi: New-Age Components for Old-Fashioned Java," Proc of ACM Press (2001).
Oberon Microsystems, Inc., "Component Pascal Language Report," (1997).
Odersky., "Objects + Views = Components?," Abstract Machines 2000, Lecture Notes in Computer Science (2000).
Papadopoulos et al., "Coordination Models and Languages," Report SEN-R9834 (1998).
Reid et al., "Knit: Component Composition for Systems Software," OSDI, 347-360 (2000).
Seco et al., "A Basic Model of Typed Components," ECOOP, 108-128 (2000).
Tarr et al., "N Degrees of Separation: Multi-Dimensional Separation of Concerns," Prop. of ICSE (1999).
Archermann et al., Piccola—A Small Composition Language, Software Composition Group, Institute of Computer Science and Mathematics, University of Berne, Switzerland, 1-23 (2001).
Alderich et al., ArchJava: Connecting Software Architecture to Implementation, downloaded from http://www.cs.washington.edu/homes/jonal/archjava/archjava-paper.pdf on Aug. 9, 2001.
Szyperski, Component Software, Beyond Object-Oriented Programming, ACM Press, 2001.
Magee et al., Composing Distributed Object in CORBA, IEEE, pp. 257-263 (1997).
Jamil et al., A Declarative Semantics for Behavioral Inheritance and Conflict Resolution, SiteSeer, pp. 130-144 (1995).
Bruno et al., Architectural Framework for Developing Concurrent Applications, IEEE, pp. 256-261, 1995.
Lavender, Selected Papers, http://www.cs.utexas.edu/~lavender/papers/, pp. 1-2, 2006.
Posnak et al., Adaptive Configuration an Object Structural Pattern for Adaptive Applications, 3rd Pattern Languages of Programming Conference, Monticello, Illinois, pp. 1-10, Sep. 1996.
Posnak et al., An Adaptive Framework for Developing Multimedia Software Components, ACM, pp. 43-47, Oct. 1997.

\* cited by examiner

FIG. 3

| | | |
|---|---|---|
| $P$ | ::= | $defn^*\ e$ |
| $defn$ | ::= | interface $i$ extends $i^*$ {$MD^*$} |
| | | \| component $\check{c}$ {$PD^*\ FD^*\ Cons_{\check{c}}\ MD^*\ CD^*$} |
| $PD$ | ::= | $p_i\ pd\ \|\ p_o\ pd$ |
| $CD$ | ::= | class $c$ implements $i^*$ extends $c$ {$FD^*\ Cons_c\ MD^*$} |
| $FD$ | ::= | $t\ f$ |
| $Cons_{\check{c}}$ | ::= | $\check{c}([t\ var]^*$ {This.$f^*$ = $var^*$; attach $pd^*$ : $p_i^*$ to $c^*$} |
| $Cons_c$ | ::= | $c([t\ var]^*$ {This : $\check{c}$.super($var^*$); this.$f^*$ = $var^*$} |
| $MD$ | ::= | $t\ m\ (\ [t\ var]^*\ )$ {$Body^*$} |
| $Body$ | ::= | $e\ \|$ abstract |
| $e$ | ::= | $var\ \|$ null $\|$ new $z([t\ var]^*)\ \|$ view $t\ e$ |
| | | \| <u>This : $\check{c}.f$</u> \| <u>this : $c.f$</u> |
| | | \| <u>This : $\check{c}.m(e^*)$</u> \| <u>This : $\check{c}$.this : $c.m(e^*)$</u> \| <u>This : $\check{c}.e$ : $c.m(e^*)$</u> |
| | | \| <u>$pd$ : $p_o.m\ (\ e^*\ )$</u> \| connect <u>$e$ : $p_o$</u> to <u>$e$ : $p_i$</u> |
| $var$ | ::= | variable name or this or This |
| $pd$ | ::= | port identifier |
| $prm$ | ::= | primitive types (int,char,etc.) |
| $\check{c}$ | ::= | component identifier |
| $c$ | ::= | class identifier |
| $i$ | ::= | interface identifier |
| $f$ | ::= | field identifier |
| $m$ | ::= | method identifier |
| $p_i$ | ::= | in $i$ |
| $p_o$ | ::= | out $i$ |
| $z$ | ::= | $c\ \|\ \check{c}$ |
| $t$ | ::= | $z\ \|\ i\ \|\ c\ \|\ \|\ p_i\ \|\ p_o\ \|\ prm;$ |

FIG. 4

| | |
|---|---|
| ComponentOnce(P) | component $\tilde{c}$...component $\tilde{c}'$... is in $P \rightarrow \tilde{c} \neq \tilde{c}'$ |
| PortOnce(P,$\tilde{c}$) | component $\tilde{c}$ {...$p$...$p'$...} is in $P \rightarrow p \neq p'$ |
| InterfaceOnce(P) | interface $i$...interface $i'$... is in $P \rightarrow i \neq i'$ |
| ClassOnce(P,$\tilde{c}$) | component $\tilde{c}$ {...class $c$ ... class $c'$...} is in $P \rightarrow c \neq c'$ |
| MethodOnce(P,$\tilde{c}$) | component $\tilde{c}$ {...$m$...$m'$...} is in $P \rightarrow m \neq m'$ |
| MethodOnce(P,c) | class $c$ {...$m$...$m'$...} is in $P \rightarrow m \neq m'$ |
| FieldOnce(P,$\tilde{c}$) | component $\tilde{c}$ {...$f$...$f'$...} is in $P \rightarrow f \neq f'$ |
| FieldOnce(P,c) | class $c$ {...$f$...$f'$...} is in $P \rightarrow f \neq f'$ |
| InterfaceAbstract(P) | interface{...$m$(...)}{$B$}...} is in $P \rightarrow m$ is abstract |

$\Upsilon_P^{i,i'}$  $i \longmapsto$ interface $i$ extends $i'$ is in $P$ $\Upsilon_{P,\tilde{c}}^{c,c'}$  $c' \longmapsto$ component $\tilde{c}$ {...class $c$ extends $c'$...} is in $P$ $\Upsilon_{P,\tilde{c}}^{c,i}$  $i \longmapsto$ component $\tilde{c}$ {...class $c$ implements $i$ ...} is in $P$ $<:$ is a reflexive, transitive closure of $\Upsilon_P^{i,i'} \cup \Upsilon_{P,\tilde{c}}^{c,i}$

FIG. 4 cont.

| | |
|---|---|
| WellFounded(P) | <: is antisymmetric |
| ClassMethodOK(P,c) | <: Inheritance is consistent, method overriding preserves type, and classes implement all interface methods that its inherits. |
| InterfaceMethodOK(P) | <: Inheritance or redeclaration of method are consistent, and methods cannot return or accept interface and class types (only component, port, and primitive types are allowed in methods declared in an interface) |
| NoAbstractMethod(P,č) | <: Component have no abstract methods |
| NoAbstractMethod(P,c) | <: Class have no abstract methods |
| PortsOK(P) | <: Inheritance or redeclaration of ports are consistent |
| $\in_P^{i,m}$ | Method $m$ is declared in $i$ $\langle s\ m(var_1 : s_1 \ldots var_n ; s_n), E \rangle \leftrightarrow$ interface $i \ldots \{s\ m(s_1\ var_1,\ldots,s_n\ var_n)\ \{E\}$ is in $P$ |
| $\in_P^{\check{c},c}$ | Class $c$ is contained in a component $\check{c}$ |
| $\in_P^{\check{c},m}$ | Method $m$ is contained in a component $\check{c}$ |
| $\in_P^{\check{c},p}$ | Port $p$ is contained in a component $\check{c}$ |
| $\in_P^{c,f}$ | Field $f$ is contained in a component $\check{c}$ |
| $\in_{P,\check{c}}^{c,m}$ | Method $m$ is contained (or inherited) in a class $c$ that is defined in a component $\check{c}$ |
| $\in_{P,\check{c}}^{c,f}$ | Field $f$ is contained (or inherited) in a class $c$ that is defined in a component $\check{c}$ |
| $\in$ | $\in_P^{\check{c},c} \cup \in_P^{\check{c},m} \cup \in_P^{\check{c},p} \cup \in_P^{\check{c},f} \cup \in_{P,\check{c}}^{c,m} \cup \in_{P,\check{c}}^{c,f}$ |
| WellFormed(P) | $P$ is well-formed if all of the above predicates and relations are satisfied. |

METHOD AND APPARATUS FOR PROGRAMMING SOFTWARE COMPONENTS

CROSS REFERENCE TO RELATED APPLICATIONS

This application a continuation of U.S. patent application Ser. No. 09/925,580, filed on Aug. 9, 2001 which claims the benefit of U.S. Provisional Application No. 60/276,237, filed Mar. 15, 2001.

FIELD OF THE INVENTION

The present invention relates generally to the fields of software programming and, more particularly, to methods and apparatus for programming software components.

BACKGROUND OF THE INVENTION

The cost and complexity of developing large-scale software systems has increased dramatically in recent years. Software reuse and software maintenance are two of the biggest challenges in software engineering. Software reusability is a performance metric indicating the degree to which a software module or other software product can be used in more than one computer program or system. Software maintenance includes any modifications to a software product after the product is initially delivered, e.g., to correct faults, improve performance or to adapt the product to another environment.

Object-oriented (OO) software development techniques have been said to offer significant advantages in the context of software reuse and maintenance. Generally, object-oriented techniques represent real-world and abstract objects using programmed objects. The concept of abstraction allows object-oriented programmers to focus only on relevant characteristics of the real-world domain. While object-oriented programming techniques have offered significant advances in the area of software reuse and maintenance, such object-oriented techniques suffer from a number of limitations, which if overcome, could greatly improve the ability to reuse and maintain software products.

Most current component technologies are based on a set of standards, such as Component Object Model (COM), Enterprise JavaBeans (EJB), and Common Object Request Broker Architecture (CORBA). For a more detailed discussion of the current state of component software technology, see, for example, Clemens Szyperski. Component Software: Beyond Object-Oriented Programming. Addison-Wesley, 1999, incorporated by reference herein.

Generally, these component models define a set of interfaces or services that can be invoked by clients. Existing component models have strived to ensure that components are reusable modules that can be inserted into any compatible system, without knowing the internal details of the component. For example, a component that is developed using the WebSpere platform from International Business Machines Corporation of Armonk, N.Y. should seamlessly be portable to a WebLogic platform. In practice, however, this generally does not happen since components are artifacts of Application Programming Interfaces (APIs), and there is no clear semantic definition of a component. Currently, very little research has been done in promoting components as first-class citizens in a main stream programming language.

A need therefore exists for a method for programming software components that enhances the maintainability and reusability of components.

SUMMARY OF THE INVENTION

Generally, a method and apparatus are disclosed for programming software components that treat software components as the basic unit of abstraction and computation. Thus, a software component is encapsulated and classes and other program entities, such as data fields and methods, within a given component do not exist beyond a component boundary. One component cannot inherit another component's internal structure and behavior.

A component interacts with other components only by means of a defined set of input and output ports. A component can inherit and implement ports declared in a template and can declare and implement new ports. A component must attach each of its input ports to a concrete class within it. Thus, when a message arrives at an input port of a component, the messages should be processed by some logic (i.e., classes) in the component.

A component can only access the external environment through its output ports. Thus, a component can only invoke services of other components via its own output ports. An output port of one component can only be connected to a conforming input port of another component. Port typing restricts the kinds of messages (i.e., operations) that can be passed from one component to another component. A connect statement is an explicit plumbing operation for connecting components together. The connect statement creates dependencies among components and ensures that the corresponding types and protocols of each connected component match.

According to a further feature of the invention, interactions between components are loosely coupled. A looser coupling between components helps improve reusability and maintenance of components. Generally, one component is not aware of the identity of other components in a system. Among other benefits, loose coupling enhances maintainability and reusability of components. Implicit invocation is an architectural style for achieving such loose coupling among components. A related set of templates can be grouped together to form a group. Groups are useful for implementing implicit invocation and multicasting.

A more complete understanding of the present invention, as well as further features and advantages of the present invention, will be obtained by reference to the following detailed description and drawings.

BRIEF DESCRIPTION OF THE DRAWINGS

FIG. 3 defines the syntax used by the present invention; and

FIG. 4 outlines the identifies used by the present invention.

DETAILED DESCRIPTION OF PREFERRED EMBODIMENTS

Figure 1:
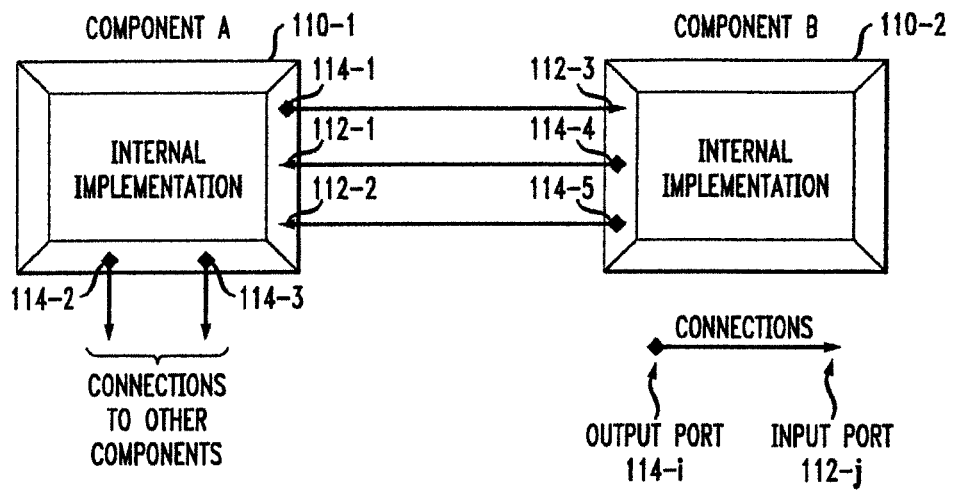
FIG. 1 illustrates the structure of two exemplary components in accordance with the present invention.

According to one aspect of the present invention, a software programming environment is disclosed for programming software components. In the software programming environment of the present invention, software components are first-class citizens that have precisely defined sets of input and output typed ports. FIG. 1 illustrates the structure of two exemplary components 110-1, 110-2 (collectively, referred to as components 110) in accordance with the present invention. According to another aspect of the present invention, a component 110 is the basic unit of abstraction and computation. Thus, classes and other program entities within a given component 110 do not exist beyond a component boundary.

As shown in FIG. 1, a component 110 has a number of input ports 112-1 through 112-N (collectively, input ports 112) and a number of output ports 114-1 through 114-N (collectively, output ports 114). A component 110 interacts or communicates with another component, such as the component 110-2, only via these ports 112, 114. Thus, these ports 112, 114 are interfaces or plumbing mechanisms that connect components 110 together.

A component 110 is required to specify certain external contracts so that other components 110 can connect to it. Contracts of a component 110 may consist of both input contracts and output contracts. One should be able to specify these contracts at an abstract level without worrying about the implementation details. The software programming environment of the present invention provides a template to specify a part of the abstract contract of a component 110. As discussed further below in a section entitled "Defining and Creating Components," template consists of declarations for input ports and output ports. A port in a template consists of three parts: (1) a keyword indicating the direction of the port (either in or out); (2) a type, such as Bool, indicating the type of the port; and (3) a name for the port, such as xin. The type of the port can only be of interface types (since we use interface to plumb components together).

A component 110 in the software programming environment of the present invention implements the abstract "contract" defined by a template. As shown in FIG. 1, a component 110 in the present software programming environment consists of two portions: (1) an external portion that other components 110 can see, and (2) an internal portion that is private to the component 110. Thus, a client cannot access the implementation of a component 110 directly, but only through the input ports 112 of the component 110.

A component 110 can inherit and implement ports declared in a template (additionally, a component 110 itself can declare and implement new ports). The internal portion of a component 110 is made of a set of data fields, methods, and classes. When messages (i.e., interface operations) arrive at an input port of a component 110, the messages should be processed (i.e, implemented) by some logic (i.e., classes) in the component 110.

A component 110 must attach each of its input ports 112-*i* to a concrete class within it. This class acts as a proxy to the messages that arrive at the input port 112. The proxy class should be able to handle all operations that arrive at the input port 112 (i.e., implement the interface of the input port 112). A connect statement is an explicit plumbing operation for connecting components together. The connect statement creates dependencies among components and ensures that the corresponding types and protocols of each connected component 110 match. A component can only invoke services of other components via its own output ports. This feature allows a looser coupling between components. Looser coupling helps improve reusability and maintenance of components. Thus, a component 110 can only access the environment through its output ports 114.

The basic properties of software components 110 are discussed further below in a section entitled "Basic Properties of Software Components."

ILLUSTRATIVE EXAMPLE

Consider a simple example where a client wants to interact with a boolean component that implements standard Boolean operations (such as not and nand). The first step is to define an interface (i.e., the set of operations) that the Boolean component is expected to provide. The following code segment defines an interface Bool that defines two standard operations (not and nand) on the primitive boolean type.

```
interface Bool {
    boolean not(boolean x) ;
    boolean nand (boolean x, boolean y) ;
}
```

The following code segment is a template for a boolean component 110 that consists of only one input port 112. In general, a template may consist of multiple input ports and multiple output ports.

```
template BooleanTempl {
    in Bool xin ; // input port
}
```

The following code segment defines a component 110, referred to as BooleanComp, implementing the template, BooleanTempl, defined above:

```
component BooleanComp implements BooleanTempl {
    attach xin BoolClass ; // attach input port xin to class BoolClass ;
    BooleanComp( ) {...} // constructors.
    class BoolClass implements Bool {
        boolean not(boolean x) { ...} ;
        boolean nand (boolean x, boolean y) {...}
    }
}
```

Thus, the input port xin is "attached" to the class BoolClass. This completes our implementation of BooleanComp components. Thus, the class BoolClass should be able to handle all operations that arrive at the input port xin.

The following code segment creates a client that uses the boolean component:

```
component ClientC {
    out Bool xout ; // output port
    ClientC( ) {...} ; // component constructor
    static void main( ) {
        boolean c = true ;
        BooleanComp BC = new BooleanComp( ) ; // create a
            component instance
        ClientC CC = new ClientC( ) //
        connect CC.xout to BC.xin ; // connect the two components
        boolean c1 = CC.xout.not(c) ; // get your work done
        boolean c2 = CC.xout.nand(c,c1) ;
        disconnect CC.xout ; // finally disconnect.
    }
}
```

The client component ClientC has one output port 114. The main( ) method can only be called by the virtual machine (VM) or the runtime system, and is the entry point to the application. In ClientC, an instance of ClientC and BooleanComp components are created. Next, the output port CC.xout of the ClientC instance is connected to the input port BC.xin of the BooleanComp instance. The connect statement is an explicit plumbing operation for connecting components together. Once the connection is established, the services of BooleanComp component can be used.

As previously indicated, a component 110 can only invoke services of other components 110 via its own output ports 114. In the present example, tt is important to remember that the not( ) service is available at the output port 114 only if the output port 114 was previously connected to a component 110 that provides the not service.

Basic Properties of Software Components

A component 110 in accordance with the present invention is a pluggable unit. Generally, a component 110 is comprised of a collection of classes. A key concept in building a software system from off-the-shelf software components is the notion of abstraction. To use a component 110, a programmer should know what it is expected to do when assembled as part of a system. To assemble a component 110 in a system, the component 110 must have input and output connections. Thus, a component 110 is a unit of abstraction with connection ports 112, 114.

A component 110 in accordance with the present invention employs typed ports for plumbing. Components 110 interact with other components 110 only via their input and output ports 112, 114. Types are used as a plumbing mechanism to connect components together. An output port 114 of one component 110-$a$ can only be connected to a conforming input port 112 of another component 110-$b$. Typing essentially restricts the kinds of messages (i.e., operations) that can be passed from one component 110-$a$ to another component 110-$b$.

The software programming environment of the present invention provides templates that allow the various contracts of components 110 in the system and how components interact with one another to be specified at a very high level. Templates give signatures to components 110.

Components 110 in accordance with the present invention and interactions between components 110 are loosely coupled. Ideally, one component 110-$a$ should not be aware of the identity of other components 110 in the system. Loose coupling enhances maintainability and reusability of components. Implicit invocation is an architectural style for achieving such loose coupling among components.

There is no inheritance mechanism between components 110. Components 110 are individual off-the-shelf units. One component 110 cannot inherit another component's 110 internal structure and behavior. A component 110 itself is made of some internal structures that are not observable beyond the component 110. These internal structures can have inheritance relations among themselves. One can think of a component to be made of a set of related classes that implement the logic of the component, in a similar manner to Design Patterns.

Components 110 in the software programming environment of the present invention do not have global states (such as global variables, public classes, and public methods) that are visible throughout the system. Global states inhibit reuse and maintenance of software components.

The only interaction that a component 110 has with the external world is through its input/output ports 112, 114. The specification or the contract of a component 110, such as the input and output behavior, invariance, and dependencies to other components 110 should be clearly specified. For example, for a File Transfer Protocol (FTP) component 110, it is important that a client first "connects" to a file server before issuing a get file command.

Defining and Creating Components

Interfaces

Interfaces are a set of named operations and defined constants. In the present programming environment, interfaces are used to type ports 112, 114 in a template, and also to type method parameters and return values. The present programming environment supports multiple inheritance among interfaces. Interface inheritance establishes a subtype relation among interfaces. If a first, interface, I, extends a second interface, J, then I is called the subtype of J, and is denoted as I<: J. If I<: J, then I can be substituted in place of J. The subtype relation in the present programming environment forms a directed acyclic graph structure, where nodes are interfaces and edges correspond to the subtype relation.

Templates

A template is a signature to components 110. A template consists of a set of declarations for constructors, input ports 112, and output ports 114. A template may be implemented by one or more components 110. Both the input ports 112 and the output ports 114 are typed. These ports 112, 114 act as connectors when component instances are connected or plumbed together. The port names within a template should be distinct, and multiple ports can have the same type.

In the present environment, one template can extend other templates, forming a template inheritance hierarchy. Once again, the template inheritance hierarchy forms a directed acyclic graph (dag) structure. Let T and S be two templates, such that T extends S. Then T is called a sub-template of S, and is denoted as T<<S. One can substitute T where S is expected. If T extends S, then T inherits all the constructors, input ports 112, and output ports 114. T can also define its own constructors and ports.

A sub-template can redefine the type of a port 112, 114. Let a template T extend another template S, and let Ti and To be the types of an input port 112 and an output port 114 of T, respectively. Also, let Si and So be the types of the corresponding input port 112 and the output port 114 in S, respectively (i.e., the port names are the same in both templates). Then, for the override to be safe, Ti<: Si, and So<: To. In the present environment, templates are passed as parameters to methods and template values are returned.

In the present environment, template constructors are used for supporting implicit invocation and multicasting, as discussed below in a section entitled "Implicit Invocation and Multitasking." A signature of a constructor consists of the number of parameters, and the type of each parameter. Constructors do not have a return type. A template can inherit a constructor declaration from its ancestor template. The inherited constructor in a template T gets the same name as T. Let a template T extend another template S, and Ct and Cs be constructors declared in the two templates, respectively. Ct and Cs are said to be equivalent if and only if they have the same number of parameters and the type of each parameter is also the same. Also, Ct is said to override Cs. The name of a constructor does not affect the equivalence relation.

Groups

A related set of templates can be grouped together to form a group. For instance, group MyGroup {T1, T2, . . . , Tn} forms a new group with MyGroup as its group name and templates T1 to Tn as its members. As discussed further below in a section entitled "Implicit Invocation and Multi-tasking," groups are useful for implementing implicit invocation. A component can register or subscribe to a group. A client can publish content to a group and all the registered components will receive the published content from the group.

Components

A component 110 is a unit of computation. A component definition consists of two portions: an external portion and an internal portion. The external portion consists of a set of input ports 112, output ports 114, and constructors. A component 110 may implement a template structure, in which case it should implement all the input ports 112 and constructors defined in the template. A port (constructor) in a component 110 can override a port (constructor) declared in a template, and the overriding rule is exactly the same as for the template override defined above. There is no inheritance relation among components 110. Each input port 112 in a component 110 should be attached (using the attach command) to some concrete class with in the component 110. This class should implement the type of the input port 112. The "attached" class acts as a proxy to the information arriving at that input port 112. An input port 112 can be attached to more than one class. In this case, when information arrives at the input port 112, the information is forwarded to all the attached classes, in a similar manner to multicasting.

In the programming environment of the present invention, new instances of a component 110 are created using the "new" command. For example, the statement MyComponent myComp=new MyComponent( ) creates an instance of the component 110 by invoking the constructor MyComponent( ). The keyword "This" is used as the reference to the current component instance. As used herein, the term "one component interacts with another component,' generally means component instances. In other words, a component instance must first be created before methods at the output port can be connected and invoked. But, sometimes we need the ability to invoke certain operations even prior to creating component instances, such as the ability to initialize a component 110. A component 110 can have a special initialization function, init( ) that can be directly called by the client component without instantiating a component instance. An init( ) function can take a set of typed parameters and can return a typed value.

Members in a component 110 may be declared as static, in which case the members are common to all instances of a component 110. The method main( ) is a special static method that only a virtual machine (VM) or a runtime system can use as an entry point to the application. Each component instance may have its own instance fields. A component 110 can define private interfaces that the classes within the component 110 can implement. A class may implement only interfaces that are defined at the input port 112 or the interfaces that are private to the component 110. Private interfaces are useful when components 110 perform complicated tasks within it.

Classes

Classes and methods in a component 110 implement the logic of the component 110. One can create instances of a class using the "new" operator. We use the keyword "this" as the reference to the current class instance. Classes in a component 110 can have only instance members, and static declarations are not allowed within a class definition. Members of a class can be declared as private. A private member is visible only within the class. Once again, there are no public and protected modifiers in a class.

Classes can use component fields and methods to pass information between classes. The class hierarchy forms a tree-like structure, in a similar manner to single implementation inheritance. The present invention does not allow extension of a class beyond the component boundary. A class or a method in a class can also be declared "abstract." An abstract method in a class is implemented by an heir class of the abstract class. An input port cannot be attached to an abstract class (since one cannot create instances of abstract classes, and ports connect component instances).

It is noted that while "this" is used to reference the current class instance, "This" is used for component instances.

Types

The type system of the present invention consists of primitive types, interface types, component types, template types, class types, and group types. Currently, only port types are restricted to be of interface types. Other entities like component fields, class fields, method parameters, return values, and variables can be of any type.

Connecting Components

Integration is a process by which multiple components are made to cooperate. The term integration is often variably referred to as composition, plumbing, interaction or communication. An integration can be either loosely coupled, where components have little knowledge about the existence of other components, or tightly coupled, where a component knows of the existence of other components that the component is interacting with. Loose coupling helps to reduce the impact on the system when components are added, removed or changed. Also, loose coupling allows much better reuse of components. On the other hand, tight coupling helps in improving the overall performance of the system. The present invention supports both loose coupling and tightly coupling of components.

A component 110-a that wants to interact with another component 110-b should first create an instance of that component 110-b. Consider the component, ClientC, discussed in the illustrative example above. In the main( ) program, we first created an instance of the BooleanComp component, and then we connected the output port 114 of an instance of the ClientC component 110 to the input port 112 of the BooleanComp component 110. In this case, the client is aware of the existence of the BooleanComp component. The connect statement establishes an explicit connection between the two components. When we invoke CC.xout.not( ) the client component ClientC knows the component with which it is interacting. Notice that ClientC is still not aware of which implementation within BooleanComp will satisfy the call request.

According to another feature of the invention, an output port 114 of one component 110 can be connected to an input port 112 of another component 110 only if they have compatible types. Let CC.xout be an output port 114 of a component CC and BC.xin be the input port 112 of another component BC. For the statement "connect CC.xout to BC.xin" to be safe, the interface type S of BC.xin must be a subtype of the interface type T of CC.xout. This is because any operation that the component CC requests via its xout port 114 should be supported by the component BC at its xin port 112. An output port 114 of a component 110 can be connected to an input port 112 of more than one component 110. This multiple simultaneous connection can be used to implement multicasting and design patterns like the Observer pattern, as discussed in the following section.

Implicit Invocation and Multicasting

Ideally, one component 110-a should not be aware of the identity of other components 110 in a software system. The interaction between components 110 should be completely decoupled. Decoupling component interactions significantly improves maintainability, adaptability, and reusability of components. The interaction between decoupled components is referred to as implicit invocation. Observer pattern, event-driven mechanism, selective broadcasting, publish-subscribe model, and multicasting are some of the designs that support some form of implicit invocation.

Implicit invocation is a software architecture style that allows software components to announce interesting events, which in turn, cause the actual invocation to happen on all those components that have registered interests in the events. In implicit invocation, an event announcer is decoupled from the event recipients. Usually a central mechanism manages the dependencies between the announcer and the recipients. Possible applications of implicit invocation include real-time data distribution (such as weather report, stock reports, and sports score report), file distributions for software updates, and email groups.

For example, an Observer pattern implements a way to capture one-to-many dependencies between objects so that when one object changes state, all its dependent objects are notified and updated automatically. An Observer pattern consists of two kinds of players: (1) the subject that publishes the change, and (2) a set of observers that wants to observe the change. Assume that you subscribe to a stock-tip mailing group, and within this group certain members (i.e., the observers) are interested only in certain kind of stock sectors. A stock-tip publisher publishes stock tips on different sectors to the group. The system will selectively send only those stock tips to the sectors that the members selected. To implement the Observer pattern, a group is initially created using the group construct. A group consists of a set of templates, and these templates act as filters to messages sent to the group. A group acts as a mediator between the publisher and the subscribers. The interface hierarchy for stock tips is defined as follows:

```
interface StockTipI {
    generalTip(String s) ; // general tips
}
interface FinStockTipI extends StockTipI {
    finTip(String s) ; // financial stock tips
}
interface TechStockTipI extends StockTipI {
    techTip(String s) ; // tech stock tips.
}
```

Next, the templates for stock components are defined as follows:

```
template StockT {
    StockT( ) ; // constructor declaration
    in StockTipI sin ;
}
template FinStockT extends StockT {
    FinStockT( ) ; // constructor
    in FinStockTipI sin ;
}
template TechStockT extends StockT {
    TechStockT( ) ; // constructor
    in TechStockTipI sin ;
}
```

In the above template hierarchy, FinStockT and TechStockT are sub-templates of StockT. The constructors FinStockT( ) and TechStockT both override the constructor StockT( ) for reasons described above in the sub-section entitled "Templates."

A group, referred to as StockGroup, is then created that consists of template members, as follows:

group StockGroup {StockT, FinStockT, TechStockT}

Groups are needed for achieving multicasting (e.g., where a message can be posted for a group and the message is automatically distributed to each member of the group). Components can register to a group to receive messages that are posted to the group. Templates in the group act as filters to messages sent to the group.

Stock components are then implemented using the templates defined above. These components act as observers for the stock tips.

```
component FinStockC implements FinStockT {
    attach sin to StockTipClass ; // attach the input port
    FinStockC( ) {...} ; // component constructor implementation
    class FinStockTipClass implements FinStockTipI {
        FinStockTipClass( ) {...} // class constructor
        void generalTip(String s) { // implement general tip method
            println("General Tip "+s) ;
        }
        void finTip( ) { // implement financial tip
            println("Finance Stock Tip"+s) ;
        }
    }
}
component TechStockC implements TechStockT {
    attach sin to StockTipClass ; // attach the input port
    TechStockC( ) {...} ; // component constructor implementation
    class TechStockTipClass implements TechStockTipI {
        TechStockTipClass( ) {...} // class constructor
        void generalTip(String s) { // implement general tip method
            println("General Tip "+s) ;
        }
        void techTip(String s) { // implement tech tip
            println("Tech Stock Tip"+s) ;
        }
    }
}
```

To receive information from the group StockGroup, the recipients should first register with the group, in the following exemplary manner that uses a property file (written in XML format):

```
<component name ="FinStockC">
    <register-with name = "StockGroup" \>
<\component>
<component name ="TechStockC">
    <register-with name = "StockGroup" \>
<\component>
```

An implementation of a subject that publishes stock tips is defined as follows:

```
component StockPublisher {
    out FinStockTipI finout ; // publish finance stock
    out TechStockTipI techout ; // publish tech stock
    StockPublisher( ) {...} // constructor
    static void main( ) {
        FinStockT FT = new StockGroup.FinStockT( ) // create
            observer instances
        StockPublisher SP = new StockPublisher( ) // create subject
            instance
        connect SP.finout to FT.sin ; // connect the publisher to
            subscriber
        SC.finout.generalTip("Market is good!") ; // invoke the
            interface operation
        SC.finout.finTip("Buy!") ;
}
```

The constructor declarations FinStockT( ) and StockT( ) are equivalent, and the component FinStockC implements one constructor FinStockC( ) that is a representative for both the template constructors (similarly for the tech stock constructors).

The group StockGroup consists of three templates. These templates act as filters when messages are posted to StockGroup. Notice that both the observer components FinStockC and TechStockC are registered with the group StockGroup.

The key to multicasting and filtering is the statement:
FinStockT FT=new StockGroup.FinStockT( )
Here we apply the "new" operation to a template member FinStockT of the StockGroup. The new statement creates component instances of all components that are registered with StockGroup and have implemented the FinStockT template. In our case, although both FinStockC and TechStockC components have registered with StockGroup, only FinStockC component implements FinStockT template. Therefore, the new statement creates an instance of only FinStockC component (and no instance for TechStock is created).

The statement connect "SP.finout to FT.sin" connects the component instance of StackPublisher to component instances pointed to FT, which here is the component FinStockC.

The two method invocations "SC.finout.generalTip("Market is good!")" and "SC.finout.finTip("Buy!")" once again invoke only methods defined in the FinStockC component.

It is noted that a single call statement such as SC.finout.finTip("Buy!") may invoke methods in more than one component. It is further noted that the subject component is not even aware of the observer components that participate. Typically, in object oriented implementations of the Observer pattern, the subject gets a handle to instances of the observer (this is because, the observer has to first register with the subject that it is interested in the finTip( ) event).

Generic Types

Generic types allow one to define a "general" type that can be instantiated to more a specific type. Generic types are useful to define collection components. Generic components consists of a port whose type is a generic type. Genericity is based on F-bounded parametric genericity. A generic stack component is constructed as follows. First, StackInterface is defined as follows:

```
interface StackInterface<A> {
    A pop( ) ;
    push(A e ) ;
}
Next we define StackTemplate:
1template StackTemplate {
    in StackInterface <A> xin ;
}
```

Finally, we define a generic stack component:

```
template StackComponent {
    attach xin to StackClass ;
    StackComponent( ) ;
    class StackClass <A> implements StackInterface <A>{
        push(A) {...}
        A pop( ) {...}
    }
}
```

The client code for accessing the StackComponent follows:

```
template ClientTemplate {
    out StackInterface<int> xoutInt ;
    out StackInterface<char> xoutChar ;
}
```

The client component that implements the above template is as follows:

```
component ClientComponent {
    static main( ) {
        StackComponent sc = new StackComponent( ) ; // create an
            instance
        ClientComponent cc = new ClientComponent( ) ; // create
            client instance
        connect cc.xoutInt to sc.xin<int> ; // connect the two
        cc.xoutInt.push(10) ; // use the stack component.
        int x = cc.xoutInt.pop( ) ;
        connect cc.xoutChar to sc.xin<char> ;
        xoutChar.push(char) ;
    }
}
```

The above client code creates one instance of StackComponent and connects the two output ports of ClientComponent to the same input port of StackComponent. It is noted that the actual type of the port is passed only when the two components are connected together.

Higher-Order Component Programming

In the world of component-based software, a set of components interact with each other in a container. The container essentially provides services such as security, transaction coordination, and life-cycle management. A client that wants to access the services of a component has to go through the container. The present invention can model a container as a component, except that some of the ports are typed using contracts. The following example illustrates higher-order component programming:

```
interface BooleanI {
boolean not (boolean b) ;
}
component Container {
    in BooleanCont bci ;
    attach bci to BooleanComp ;
    component BooleanComp
        implements BooleanCont {
        attach bi to BooleanCls;
        class BooleanCls
            implements BooleanI {
            boolean not(boolean x){
                return ¯x ;
            }
        }
    }
}
contract BooleanCont {
    in BooleanI bi ;
}
component ClientBool {
out BooleanCont bco ;
out BooleanI bio ;
    ...
    class MainI implements Main{
```

-continued

```
        void main( ) {
            Container c = new Container( );
            connect bco to c.in ;
            connect bio to bco.bin ;
            boolean x = bio.not(true) ;
        }
    }
}
```

The input port bci of the Container component is a contract. The port bci is attached to the component BooleanComp that implements the contract type BooleanCont. The client component first creates an instance of the Container component, connects to it via bcout port. It then connects the bio to bcout.bin. Finally, it invokes the bio.not( ) service. It is noted that the client component is once again unaware of the component within Container that implements the contract BooleanCont.

Delegates

It may be useful to export a component instance method (rather than a class instance method). As previously indicated, however, one of the features of the present invention is that clients can only communicate with a component by means of its input/output ports. One possible solution is to encapsulate a component instance method in a class and then provide an interface that hooks up a class (that implements the interface) to an input port. Another solution is to use delegates to type ports. Delegates are like function pointers, except that it is secure, type-safe, and encapsulated. A delegate is a type which can be attached to a concrete method (just as an interface is a type that can be attached to a concrete class). In other words, a delegate is a type for defining a method signature, so that delegate instances can hold and invoke a method that matches its signature. The following example illustrates the use of delegates:

```
        delegate Boolean FilterD (string s);
        component FilterComp{
            in FilterD fin;
            attach xin to FilterMethod;
            boolean FilterMethod (string s) {...}
        }
        component ClientComp {
            out FilterD fout;
            ...
            void main ( ) {
                FilterComp sc = new FilterComp ( );
                connect fout to sc.fin;
                // invoke the delegate via fout.
                boolean flag = fout ("blah ...blah");
            }
        }
```

It is noted that the output port fout is connected to the input port fin, and since fout is of delegate type the service is invoked as fout( ... ).

Figure 2:
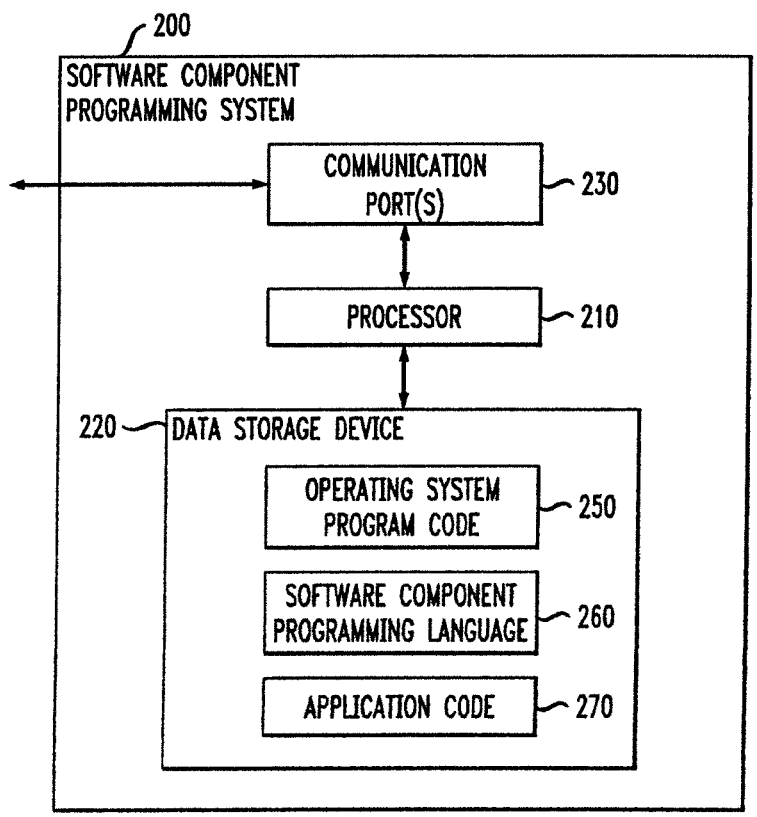
FIG. 2 is a block diagram showing the architecture of an illustrative software component programming system incorporating features of the present invention.

FIG. 2 is a block diagram showing the architecture of an illustrative software component programming system 200. The software component programming system 200 may be embodied, for example, as a workstation, personal computer or other computing device, as modified herein to execute the functions and operations of the present invention. The software component programming system 200 includes a processor 210 and related memory, such as a data storage device 220. The processor 210 may be embodied as a single processor, or a number of processors operating in parallel. The data storage device 220 and/or a read only memory (ROM) are operable to store one or more instructions, which the processor 210 is operable to retrieve, interpret and execute.

The data storage device 220 includes operating system program code 250, such as an exemplary Linux, Unix or Windows operating system. The data storage device 220 also includes the software component programming language 260, incorporating features of the present invention, that may be used to generate application code 270. The communications port 220 optionally connects the software component programming system 200 to a network environment (not shown).

FIG. 3 defines the syntax used by the present invention. f* means zero or more occurences of f, [t f]* means $t_1 \, f_1 \ldots t_n \, f_n$, and this.f* means this.$f_1 \ldots$ this.$f_n$. The underlined parts shown in FIG. 3 are the context introduced by type elaboration.

FIG. 4 outlines the identifies used by the present invention. It is assumed that names for variables, components, contracts, interfaces, classes, fields and methods are distinct.

It is to be understood that the embodiments and variations shown and described herein are merely illustrative of the principles of this invention and that various modifications may be implemented by those skilled in the art without departing from the scope and spirit of the invention.

What is claimed is:

1. A method executed by a processor for programming a software component, said method comprising the steps of:
   defining properties of said software component, including at least one input port and at least one output port;
   providing a software mechanism for instantiating said software component;
   utilizing an attach command to attach at least one of said at least one input port to a class; and
   allowing said software component to access an external environment only through said output port.

2. The method of claim 1, further comprising the step of allowing a client to access said software component only through said input port.

3. A method executed by a processor for programming a software component, said method comprising the steps of:
   defining properties of said software component, including at least one input port and at least one output port;
   providing a software mechanism for instantiating said software component;
   utilizing an attach command to attach at least one of said at least one input port to a class; and
   allowing a client to access said software component only through said input port.

4. A system for programming a software component, said system comprising:
   a memory that stores computer-readable code; and
   a processor operatively coupled to said memory, said processor configured to implement said computer-readable code, said computer-readable code configured to:
   define properties of said software component, including at least one input port and at least one output port;
   provide a software mechanism for instantiating said software component;
   utilize an attach command to attach at least one of said at least one input port to a class; and
   allow a client to access said software component only through said input port.

5. The system of claim 4, wherein said processor is further configured to allow said software component to access an external environment only through said output port.

* * * * *